United States Patent

Corrigan et al.

[11] Patent Number: 5,881,254
[45] Date of Patent: *Mar. 9, 1999

[54] INTER-BUS BRIDGE CIRCUIT WITH INTEGRATED MEMORY PORT

[75] Inventors: Brian E. Corrigan; Alan D. Rymph, both of Wichita, Kans.

[73] Assignee: LSI Logic Corporation, Milpitas, Calif.

[*] Notice: This patent issued on a continued prosecution application filed under 37 CFR 1.53(d), and is subject to the twenty year patent term provisions of 35 U.S.C. 154(a)(2).

[21] Appl. No.: 674,592

[22] Filed: Jun. 28, 1996

[51] Int. Cl.⁶ .................................................. G06F 13/00
[52] U.S. Cl. ............................................. 395/309; 395/309
[58] Field of Search .................................. 395/281, 306, 395/307, 308, 309

[56] References Cited

U.S. PATENT DOCUMENTS

| | | | |
|---|---|---|---|
| 4,965,723 | 10/1990 | Kirk et al. | 364/200 |
| 5,083,260 | 1/1992 | Tsuchiya | 395/325 |
| 5,113,369 | 5/1992 | Kinoshita | 395/325 |
| 5,257,391 | 10/1993 | DuLac et al. | 395/800 |
| 5,263,139 | 11/1993 | Testa et al. | 395/325 |
| 5,301,281 | 4/1994 | Kennedy | 395/325 |
| 5,333,277 | 7/1994 | Searls | 395/325 |
| 5,345,565 | 9/1994 | Jibbe et al. | 395/325 |
| 5,353,415 | 10/1994 | Wolford et al. | 395/325 |
| 5,379,384 | 1/1995 | Solomon | 395/325 |
| 5,392,407 | 2/1995 | Heil et al. | 395/325 |
| 5,394,528 | 2/1995 | Kobayashi et al. | 395/325 |
| 5,396,602 | 3/1995 | Amini et al. | 395/325 |
| 5,522,050 | 5/1996 | Amini et al. | 395/306 |
| 5,533,204 | 7/1996 | Tipley | 395/288 |
| 5,548,730 | 8/1996 | Young et al. | 395/280 |
| 5,557,758 | 9/1996 | Bland et al. | 395/308 |
| 5,559,968 | 9/1996 | Stancil et al. | 395/306 |
| 5,560,022 | 9/1996 | Dunstan et al. | 395/750 |
| 5,574,937 | 11/1996 | Narain | 395/800 |
| 5,581,714 | 12/1996 | Amini et al. | 395/308 |
| 5,586,268 | 12/1996 | Chen et al. | 395/250 |
| 5,590,377 | 12/1996 | Amith | 395/842 |

(List continued on next page.)

FOREIGN PATENT DOCUMENTS

| | | | |
|---|---|---|---|
| 0489504 | 11/1991 | European Pat. Off. | G06F 13/28 |
| 0489504A | 6/1992 | European Pat. Off. | |
| 0631241 | 12/1994 | European Pat. Off. | G06F 15/16 |
| 0707357 | 12/1995 | European Pat. Off. | G06F 11/10 |
| 0717357A | 9/1996 | European Pat. Off. | |
| 0756235 | 1/1997 | European Pat. Off. | G06F 13/40 |
| 9314455 | 7/1993 | WIPO | G06F 3/06 |

OTHER PUBLICATIONS

PCI Local Bus Specification Revision 2.1; PCI Special Interest Group, Jun. 1, 1995, p. 4; Jun. 1995.

(List continued on next page.)

*Primary Examiner*—Meng-Ai T. An
*Assistant Examiner*—David A. Wiley
*Attorney, Agent, or Firm*—Daniel N. Fishman; Wayne P. Bailey

[57] ABSTRACT

A bus bridge circuit having a memory port integrated therewith for upstream memory access independent of the activity on the primary bus connected to the bridge circuit. In a preferred embodiment, the present invention adds a memory port to a PCI bridge circuit usable for upstream data transfers to an attached cache memory subsystem. The memory port of the present invention is preferably 64 bits wide to permit high speed data access to the shared cache memory subsystem. An alternative embodiment of the present invention implements a 128 bit wide data path to an attached high speed cached memory subsystem. The memory port of the present invention utilizes FIFO devices to isolate the memory port transactions from the secondary bus transactions. This FIFO design of the memory port allows bursting of high speed transfers to the shared memory, independent of activity on the primary bus, while minimizing the performance impact on the secondary bus.

16 Claims, 4 Drawing Sheets

U.S. PATENT DOCUMENTS

| | | | |
|---|---|---|---|
| 5,594,882 | 1/1997 | Bell | 395/421.02 |
| 5,608,876 | 3/1997 | Cohen et al. | 395/381 |
| 5,631,912 | 5/1997 | Mote, Jr. | 371/22.3 |
| 5,632,021 | 5/1997 | Jennings et al. | 395/309 |
| 5,634,033 | 5/1997 | Stewart et al. | 395/441 |
| 5,644,470 | 7/1997 | Benedict et al. | 361/686 |
| 5,664,122 | 9/1997 | Rabe et al. | 395/308 |

OTHER PUBLICATIONS

M. Levy, Intel 1960J Integrates PCI Interface, 40 Electronic Design News, Jun. 22, 1995, at 16–18, USA.

M.J. Garcia & B. Reynolds, Single Chip PCI Bridge and Memory Controller for PowerPC Microprocessors, Proceedings of the IEEE International Conference on Computer Design: VLSI in Computers and Processors, Oct. 1994, at 409–412, USA.

T.H. Luper, Une Architecture de Cartes Power/PC/VME Evolutive, Electronique, Oct. 1995, at 95–100, France.

IBM Technical Disclosure Bulletin; Method for Improving Peripheral Component Interconnect Bus Bandwidth for Systems with Limited Prefetch; vol. 40 No. 01; Jan., 1997; pp. 23–25.

EDN—Electrical Design News, vol. 40, No. 13, 22, Jun. 1995, Newton, MA, US, pp. 16 & 18; Intel i960JF Integrates PCI Interface.

Proceedings of the IEEE International Conference on Computer Design: VLSI in Computers and Processors; Oct. 10–12, 1994; Cambridge, MA, US, pp. 409–412; M.J. Garcia et al: Single Chip PCI Bridge and Memory Controller for PowerPC Microprocessors.

Electronique; No. 52, Oct., 1995, Paris, FR; pp. 95, 96, 99, 100; T.H. Lupfer; Une Architecture De Cartes PowerPC/VME Evolutive.

Elektronix; vol. 44, No. 19, Sep. 19, 1995, Poing DE; pp. 120, 128–130; G. Stelzer, Viel Funktionalitat mit wenig Chips.

A Case for Redundant Arrays of Inexpensive Disks (RAID); David A. Patterson et al.; Dec. 1987; pp. 1–24.

INTER-BUS BRIDGE CIRCUIT WITH INTEGRATED MEMORY PORT

BACKGROUND OF THE INVENTION

1. Field of the Invention

The invention relates to the field of bus bridge integrated circuits and in particular to a bus bridge circuit design which includes an integrated memory port for simultaneous memory access and bus data exchange.

2. Related Patents

This patent is related to commonly assigned, co-pending, United States patent application (08/673,654) entitled SCALABLE HIERARCHICAL MEMORY STRUCTURE FOR HIGH DATA BANDWIDTH RAID APPLICATIONS filed Jun. 20, 1996 which is hereby incorporated by reference. This patent is also related to commonly assigned, co-pending, U.S. Pat. No. 5,634,033, filed Dec. 16, 1994 by Stewart et al., entitled (as amended) DISK ARRAY STORAGE SYSTEM ARCHITECTURE FOR PARITY OPERATIONS SIMULTANEOUS WITH OTHER DATA OPERATIONS, which is hereby incorporated by reference.

3. Discussion of Related Art

Bridge circuits are known to connect a first electronic bus to a second electronic bus. The bridge circuit serves to adapt the signals of the two busses to enable data exchange between the two bus signal standards. Frequently, bridge circuits are used to convert between different signaling standards defined for the first and second busses. Another common application of bus bridge circuits, as discussed in related application (95-09619020-128), hereby incorporated by reference, is to connect multiple, often hierarchical busses to common devices or memory subsystems.

In RAID storage subsystem control applications, for example, a Peripheral Computer Interconnect (PCI) bus is used to connect various peripheral I/O devices through a bridge circuit to a centralized PCI bus for the overall control of all I/O devices in the subsystems as well as the cache memory subsystem.

It is common in the prior art that a bridge circuit is used to connect the various devices in the RAID subsystem both for purposes of I/O control and data exchange and for direct access to the cache memory subsystem. In such a centralized, hierarchical bus structure, the bus connected to the bridge circuit in common with other connections of other bridge circuits is referred to herein as the primary side or primary bus. The bus connected to the bridge circuit on the opposite side of the bridge relative to the primary side is referred to herein as the secondary side or secondary bus. Data flowing through the bridge circuit from the primary side to the secondary side is referred to herein as downstream data or downstream flow. Data flowing through the bridge circuit from the secondary side to the primary side is referred to herein as upstream data or upstream flow.

It is a problem in such bridge circuit designs that if the secondary bus requires a transaction be passed through the bridge circuit to access a shared resource on the primary bus, and the primary bus is unavailable due to other access unrelated to the shared resource, the request of the secondary bus is delayed until the primary bus is again available. For example, if a storage device connected to one of several secondary (PCI) busses is desirous of exchanging data with a centralized high speed cache memory subsystem connected to the primary bus, then the data exchange may be delayed if other data transfers are occupying the primary (PCI) bus, despite the potential availability of the centralized high speed cache memory subsystem.

Typical hierarchical PCI bus systems within RAID subsystem controller designs exhibit the problems inherent in the prior art. When a secondary PCI bus requires access to the shared cache memory subsystem via the primary PCI bus, the cache memory access will be delayed while the primary PCI bus is in use for normal system control functions by the main processor of the RAID controller. Such delays in performing data exchange requests can negatively impact the overall performance of the RAID storage subsystem in processing I/O requests.

It is evident from the above discussion that a need exists for an improved bus bridge circuit design which reduces the potential for such delays in processing of I/O requests.

SUMMARY OF THE INVENTION

The present invention solves the above and other problems, thereby advancing the state of the useful arts, by providing an improved bridge circuit design which integrates a memory port usable by the secondary bus to access an attached memory subsystem regardless of the present availability of the primary bus and independent of any activity on the primary bus. Specifically, the present invention adds a memory port to a PCI bridge circuit usable for upstream data transfers to an attached cache memory subsystem.

The memory port of the present invention is preferably 64 bits wide to permit high speed data access to the shared cache memory subsystem. An alternative embodiment of the present invention implements a 128 bit wide data path to an attached high speed cached memory subsystem. The memory port of the present invention utilizes FIFO devices to isolate the memory port transactions from the secondary bus transactions. This FIFO design allows bursting of high speed transfers to the shared memory while minimizing the performance impact on the secondary bus.

It is therefore an object of the present invention to provide a bus bridge circuit integrated with a memory port.

It is a further object of the present invention to provide a bus bridge circuit with an integrated memory port for upstream access to a memory subsystem without requiring access to the primary bus of the bridge circuit.

It is still a further object of the present invention to provide a memory port integrated with a PCI to PCI bus bridge circuit.

It is yet another object of the present invention to integrate a 64 bit memory port with a PCI to PCI bus bridge circuit for upstream access to a shared memory subsystem without requiring access to the primary PCI of the bridge circuit.

The above and other objects aspects, features, and advantages of the present invention will become apparent from the following description and the attached drawing.

DETAILED DESCRIPTION OF THE PREFERRED EMBODIMENTS

Figure 1:
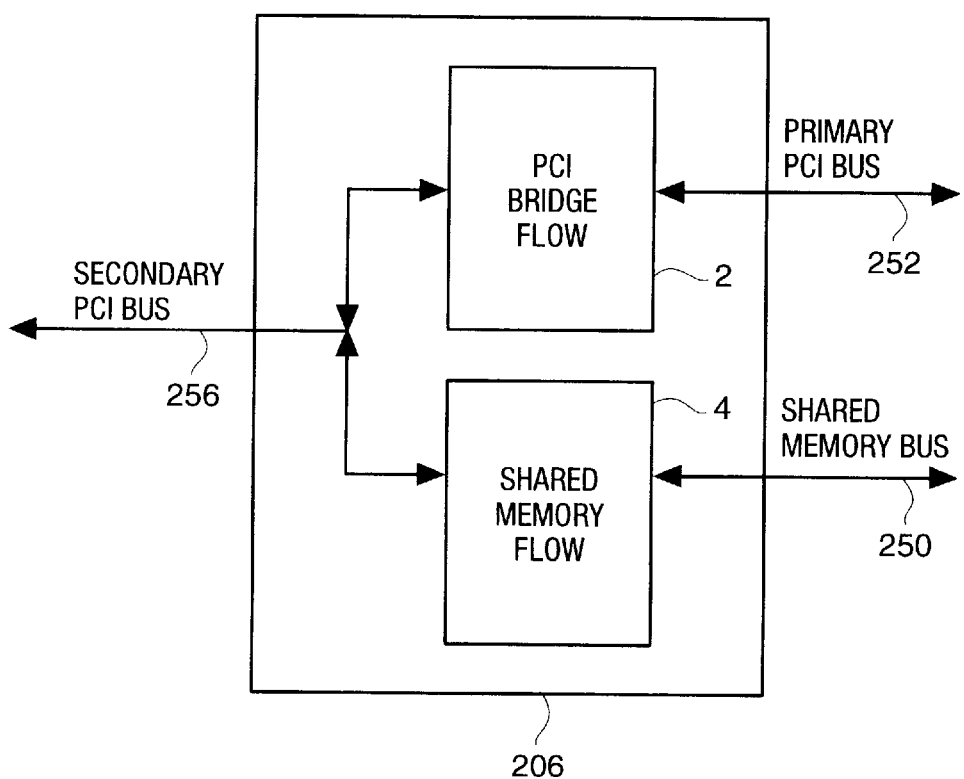
FIG. 1 is a block diagram of a bridge circuit of the present invention with a memory port integrated therewith.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 is a block diagram of the bus bridge circuit 206 having a memory port 4 in accordance with the present invention. PCI bus bridge circuit 206 includes PCI bridge flow control circuit 2 which directs the bi-directional exchange of data between secondary PCI bus 256 and primary PCI bus 252. For example, a CPU (not shown) connected to primary PCI bus 252 may access peripheral devices (not shown) connected to secondary PCI bus 256 and vice versa. However, regardless of the busy/idle status of primary PCI bus 252 due to other control operations by a CPU (not shown), devices on secondary PCI bus 256 may access a memory subsystem (not shown) connected to shared memory bus 250 via memory port 4.

Figure 2:
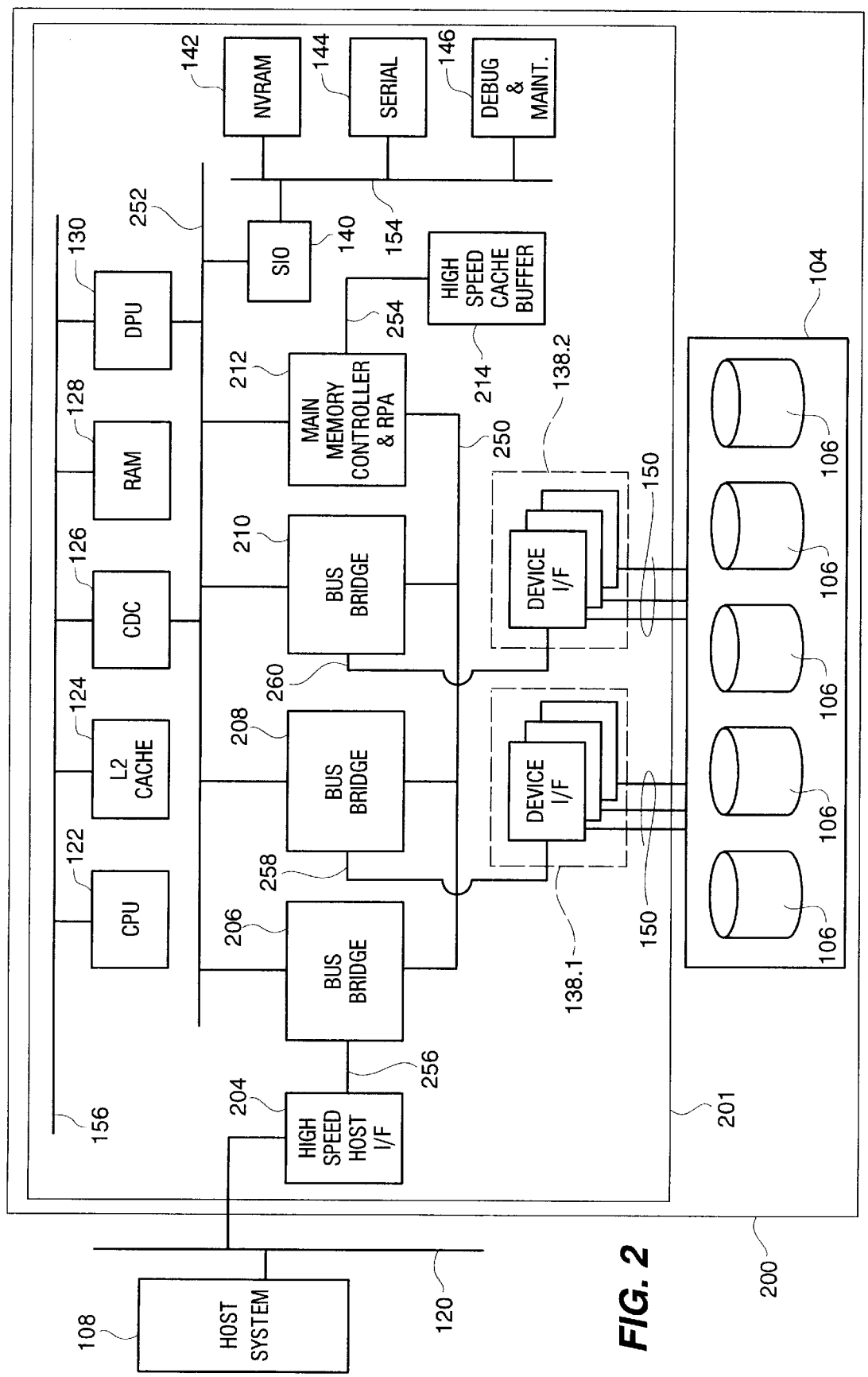
FIG. 2 is a block diagram of a RAID controller architecture in which the bridge circuit of the present invention may be advantageously applied.

FIG. 2 is a block diagram describing the structure of a RAID storage subsystem 200 in which the bus bridge circuit of the present invention is advantageously applicable. CPU 122, L2 cache 124, CDC 126, RAM 128, and DPU 130 in RAID controller 200 of FIG. 2 are connected through processor bus 156. Other system I/O peripheral devices are connected to the primary PCI bus 252 via System I/O (SIO) 140 and bus 154. NVRAM 142, serial port 144, and debug/maintenance port 146 are used in development, debug, and maintenance of the RAID controller 200 and for persistent storage of configuration parameters. Cache DRAM controller (CDC 126) and data path unit (DPU 130) exemplify such standard chip sets known (together with system I/O (SIO 140)) as the "Saturn II" chip set manufactured as part number 82420 by Intel Corporation. One of ordinary skill in the art will readily recognize that several equivalent chip sets are available to connect CPU 122, L2 cache 124, and RAM 128 to primary PCI bus 252. DPU 130 and CDC 126 are exemplary of such chip sets presently commercially available from Intel and other integrated circuit manufacturers.

High speed cache buffer 214 comprises a memory array which is both fast and wide to provide adequate bandwidth capacity for aggregated cache buffer accesses in the exchange of information. Main memory controller 212 manages the memory array of high speed cache buffer 214 exchanging data therewith via bus 254. Shared memory bus 250 connects all other components involved in the exchange of data with high speed cache buffer 214 via main memory controller 212 and bus 254. All exchange of data between high speed cache buffer 214 and other components of RAID subsystem 200 are managed by the centralized main memory controller 212 and provided thereto via shared memory bus 250. Main memory controller 212 is therefore isolated from the specific protocols and bus structure of each component within RAID subsystem 200 wishing to exchange data with high speed cache buffer 214.

Other components within RAID subsystem 200 requiring the exchange of data with high speed cache buffer 214 through shared memory bus 250 are connected thereto through a bus bridge circuit. Each bus bridge circuit 206, 208, and 210 adapts the signals applied to their respective, unique, connected bus architecture to the shared memory bus 250. Specifically, bus bridge circuit 206 adapts signals on bus 256 (e.g., a 32-bit or 64-bit PCI bus) to appropriate signals on shared memory bus 250 (and vice versa) for purposes of exchanging data between an attached host computer 108, through bus 120 and high speed host interface 204, and the high speed cache buffer 214 under the control of main memory controller 212. In like manner, bus bridge circuits 208 and 210 adapt signals on busses 258 and 260, respectively, for application to shared memory bus 250 (and vice versa). Bus bridge circuits 208 and 210 thereby provide for the exchange of information between RAID array 104 (through device interfaces 138.1, 138.2) and high speed cache buffer 214 under the control of memory controller 212.

In particular, data exchange between an attached host computer 108 and the high speed cache buffer 214 may take place concurrently with data exchange between the high speed cache buffer 214 and the disk drives 106 of the RAID array 104. Each of these data exchange operations consumes bandwidth on its own system supported bus (e.g., bus 256 and 258 or 260, respectively). Though the concurrent data exchanges will require use of the shared memory bus and the main memory controller 212 and bus 254, these components are designed to maximize bandwidth capacity. The cache memory architecture of the present invention is therefore less likely to saturate available data exchange bandwidth.

Main memory controller 212 also may provide RAID parity assist logic (RPA) to provide centralized high speed assistance for the generation and checking of RAID redundancy information (parity). This feature of the present invention serves to isolate the RAID parity transfers from the individual legacy bus structures. This further enhances the distribution of the memory access load from a plurality of legacy systems to a centralized high speed bus structure. The individual legacy busses are therefore less likely to be saturated by such parity accesses. Alternatively, the main memory controller 212 may be directed to allow the device attached to a bus bridge circuit to manage all redundancy information generation and checking.

The RAID parity assist circuits within main memory controller 212 operate on data stored in a local memory (not shown) associated therewith. It calculates parity a burst at a time utilizing an internal 128 byte FIFO (not shown) to store the results. The results are not written back to local memory. For maximum performance the control logic for the parity assist engine maintains pointers to each needed data block. The RAID parity assist operates at the full speed of the local memory bus 254 to provide the fastest possible performance for the memory bandwidth.

The parity assist engine contains 4 separate sections that allow additional tasks to be queued up while one task executes. Each task maintains its own control and status register so that task scheduling does not interfere with the currently executing task. Several configuration options are provided to tailor the RPA to the array organization. The engine can be configured as a single engine which works on wide arrays up to 22+1 drives wide, or as a four engine machine which operates with arrays as wide as 4+1 drives. Another mode provides a two engine machine with up to 10+1 drives.

The parity engine includes exclusive-OR logic providing RAID 5 and RAID 3 parity generation/checking as well as move and zero check modes.

One of the most important parts of the RPA architecture is the time independent operation it provides. Blocks of data are not required to be accessed simultaneously for parity calculations. Disk operations which span several drives may be scheduled and executed as soon as possible by each device. Unrelated disk operations may continue even though all drive operations for a single task are not yet complete. This independence improves the performance of the slowest part of the system, the disk drive. It also simplifies the software task of managing concurrent hardware resource requirements.

Further details regarding the structure and operation of RPA circuits within main memory controller 212 are contained in U.S. Pat. No. 5,634,033, filed Dec. 16, 1994, and co-pending United States patent application Ser. No. 08/673,654 filed Jun. 20, 1996.

CPU 122 is connected to primary PCI bus 252 through processor bus 156 and CDC 126 with DPU 130. This connection gives CPU 122 access to the hierarchical cache memory architecture of the present invention to permit methods operable within CPU 122 to control the operations of the bus bridge circuits 206, 208, and 210, and of the main memory controller 212. This aspect of the present invention enables methods operable within processor 122 to access an individual one of busses (e.g., 256, 258, and 260) without impacting continued high speed data access and processing by the other busses.

The higher bandwidth capacity of the cache memory architecture of the present invention permits the RAID controller 201 to be scaled up for higher performance while minimizing the needs for redesign of older legacy control systems within the RAID controller 201. For example, host interface 204 may be easily scaled up to Fibre Channel host system connections. The higher data bandwidth available in the cache memory architecture of the present invention provides sufficient bandwidth therefor while permitting easier re-use of legacy control systems in the controller. Likewise, device interfaces 138.1 and 138.2 may be scaled up to higher performance disk drive control architectures (e.g., fast SCSI, wide SCSI, SCSI 3, Fibre Channel (FCAL), etc.). The data bandwidth available in the cache architecture of the present invention enables the use of such high performance connections while minimizing the re-design necessary for legacy control structures.

Figure 3:
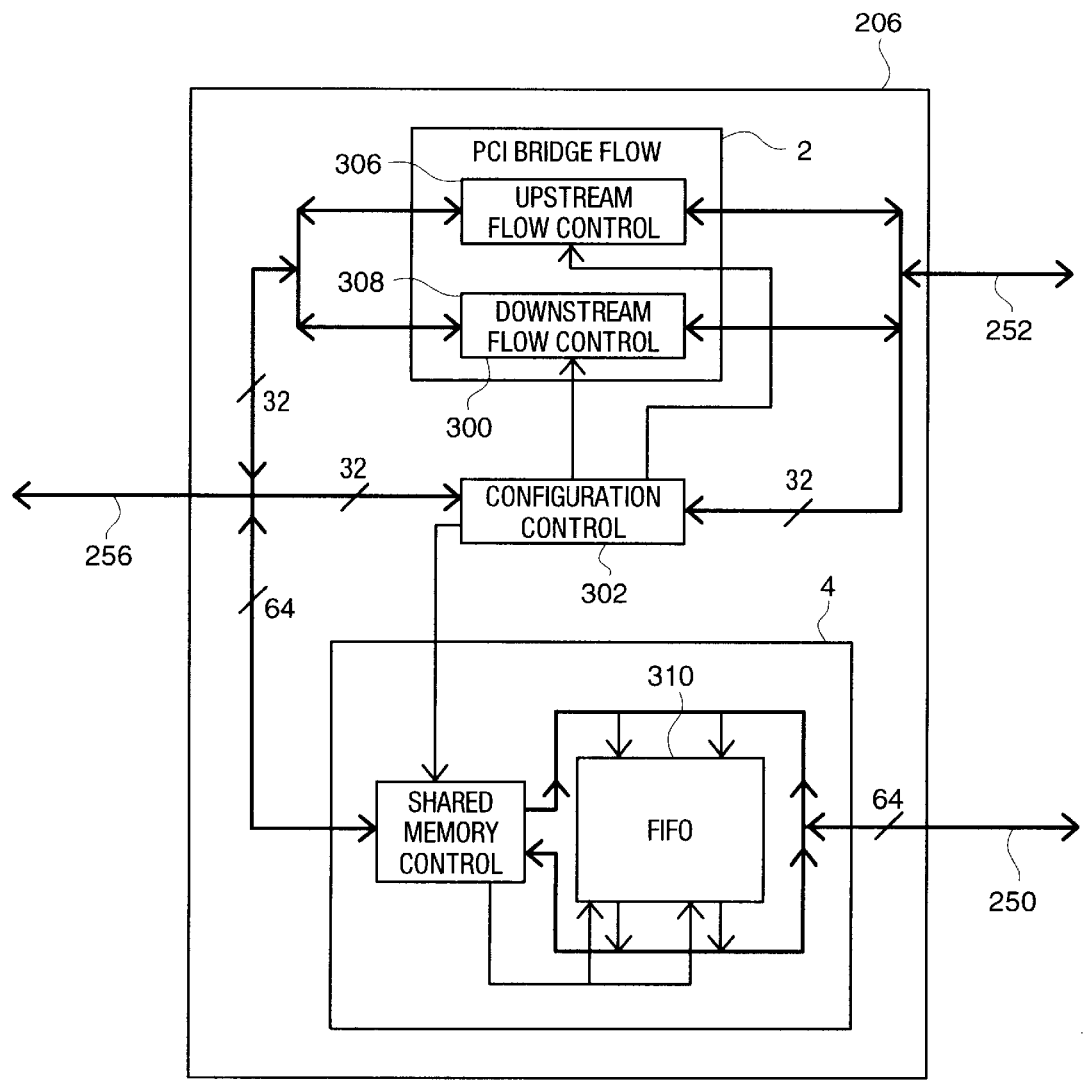
FIG. 3. Is a block diagram providing additional details of the bus bridge circuit of FIG. 1.

FIG. 3 is a block diagram providing additional details of the structure of bridge circuit 206 having a memory port 4 integrated therein in accordance with the present invention. PCI bridge flow control circuit 2 includes data paths normally contained within a standard PCI bridge circuit. Data transfers therethrough may include upstream transfers from the secondary bus 256 to the primary PCI bus 252 as well as downstream transfers from the primary PCI bus 252 to the secondary bus 256. Upstream data transfers are controlled by upstream flow control circuit 306 and downstream transfers are controlled by downstream flow control circuit 308, both within PCI bridge flow control circuit 2.

Data transfers are clocked at the PCI bus speed, preferably 33 megahertz. Primary PCI bus 252 and secondary PCI bus 256 may be either 32 or 64 bit wide PCI busses. Upstream and downstream flow control circuits 306 and 308 manage any conversions required to transfer between a 32 bit wide bus and a 64 bit wide bus.

Configuration control circuit 302 in bridge circuit 206 contains registers and related logic which oversee and coordinate the functions of the bridge circuit 1. The configuration blocks and values are as defined by industry standard PCI bus design specifications. The PCI bus standards allow for addition of custom application specific control and configuration values. The present invention therefore includes configuration register values within configuration control circuit 302 to control the operation of memory port 4 of bridge circuit 1. In particular, control and configuration registers are used to define a 64 bit address range used for transfer to and from the memory port 4. Accesses addressed to the range from the secondary PCI bus 256 are re-routed to the memory port 4 rather than the upstream flow control circuit 306.

As noted above, the shared memory bus 250 is a high speed, 64 bit wide, bus to which a plurality of bus bridge circuits 206 may be connected for shared access to a high speed shared cache memory subsystem. The shared memory bus is preferably operable at 66 megahertz. Memory port 4 includes FIFO devices 310 to enable speed matching for high speed burst access to the shared memory bus 250. The FIFO devices 310 serve to isolate the slower secondary PCI bus 256 from the high speed shared memory bus 250. This architecture prevents the slower secondary PCI bus 256 from pacing the data transfers on the shared memory bus 250. As noted above, in an alternative embodiment the shared memory bus may be implemented as a 128 bit wide bus using parallel to serial transceivers. A plurality of FIFO devices may be used to implement a particular bus width for a particular embodiment of the shared memory bus 250 and memory port 4.

Shared memory control circuit 304 uses register values defined within configuration control circuit 302 to establish threshold values for the filling and emptying of the FIFO devices 310. The threshold values are used to pace the data transfer operations between the secondary PCI bus 256 and the shared memory bus 250. Data transfers are stored in the FIFO devices 310 until the intended receiver empties the data from the FIFO devices. This permits both busses (secondary PCI bus 256 and shared memory bus 250) to operate independently at their optimal speed for bursts of data.

There are three threshold values useful in flow control of the present invention. A first threshold value is the transfer in progress (TIP) threshold. The TIP value represents the minimum number of bytes that must be present in the FIFO devices 310 before the shared memory bus 250 is requested for purposes of writing the data from the FIFO devices 310 to the shared cache memory. A second threshold value is the shared memory write (SMW) transfer limit threshold. The SMW threshold value determines the maximum number of bytes that may be transferred to the shared memory bus 250 from the FIFO devices 310 following initial acquisition of shared memory bus 250 based upon the TIP threshold value discussed above. If the SMW value is smaller than the selected TIP value, then the TIP value is reset to the SMW value to prevent a deadlock in requesting the shared memory bus 250. Finally, a third threshold value is the shared memory read (SMR) transfer limit threshold. The SMR threshold value determines the maximum number of bytes that may be transferred from the shared memory bus 250 to the FIFO devices 310 following initial request of the read from the secondary PCI bus 256. One of ordinary skill in the art will readily recognize that the threshold values may be expressed in byte sized units or any other unit of measure convenient to the particular application design. For example, the threshold values may be in units of queued words where a queued word is the combined width of the FIFO devices 310 as noted below.

The number of FIFO devices 310 may reflect the relative ratio of the bus widths of the secondary PCI bus 256 and the shared memory bus 250. As noted above, the secondary PCI bus 256 is preferably 32 or 64 bits wide while the shared memory bus 250 is preferably 64 or 128 bits wide. If, for example, the shared memory bus 250 is twice the width of the secondary PCI bus (e.g., 32 bit wide PCI bus and 64 bit shared memory bus), two FIFO devices 310 are used, each matching the width of the narrower secondary PCI bus 256. Transfers from/to the secondary PCI bus 256 to the shared memory bus 250 then fill/empty the two FIFO devices 310 in alternation. Clearly, if the secondary PCI bus 256 and the shared memory bus 250 are of equal widths, there need be no subdivisions of the FIFO device 310 to adapt the relative width of the busses. Other design considerations may also impact the selection of the number of FIFOs. For example, certain sizes and geometries of FIFO devices may be unavailable in the desired depths or the desired speeds. Such design choices are well known and easily resolved by those of ordinary skill in the art.

In particular on write data transfers, data flows from the 32 bit wide secondary PCI bus 256 into two FIFO devices 310 of memory port 4 in alternation. In read data transfers, data is loaded from the wider 64 bit shared memory bus 250 directly into the two FIFO devices 310. The data is then read in alternation from the two FIFO devices 310 and applied to the secondary PCI bus 256.

Figure 4:
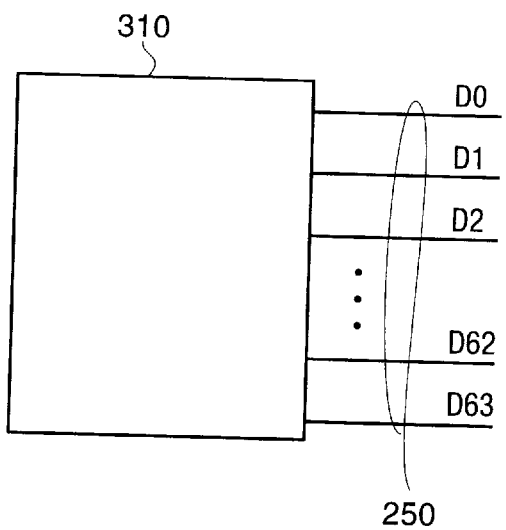
FIG. 4 is a block diagram of a first preferred embodiment of the shared memory bus connectable to the present invention as a 64-bit-wide parallel bus.

As noted above, the best presently known mode of implementing the shared memory bus of the present invention is as a 64-data-bit-wide parallel bus clocked at 66 megahertz. FIG. 4 is a block diagram depicting this best presently known structure for shared memory bus 250 of FIG. 2. Shared memory bus 250 of FIG. 4 is connected to FIFO 310 of shared memory flow 4 (of FIG. 3) of bus bridge circuits 206, 208, or 210 of FIG. 2.

Figure 5:
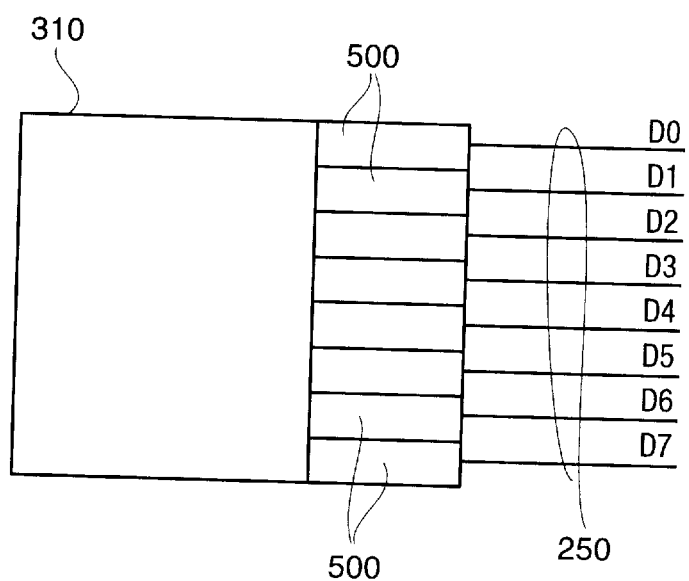
FIG. 5 is a block diagram of a second preferred embodiment of the shared memory bus connectable to the present invention as a 128-bit-wide parallel to byte serial bus.

FIG. 5 is a block diagram of an alternative embodiment of the shared memory bus 250 of the present invention in which eight, high speed, 16-bit-wide parallel to bit serial transceivers 500 are integrated into shared memory flow 4 connected to FIFO 310. This structure provides a 128-bit-wide internal bus structure connected to FIFO 310 but an 8-bit-wide (byte) serial interface as applied to shared memory bus 250. A similar byte serial, 128-bit wide bus structure is implemented in all devices connected to the shared memory bus 250. This alternate embodiment of the present invention serves to reduce the external pin count required for interconnect of bus bridge circuits 206, 208, and 210 and main memory controller circuit 212 via shared memory bus 250. The transceivers 500 are capable of data transfer speeds of at least 1 gigabit per second each to thereby provide bandwidth of 1 gigabyte per second over shared memory bus 250.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A PCI to PCI bus bridge comprising:
    a primary PCI bus port connecting said bus bridge to a primary PCI bus, wherein said primary PCI bus communicates with a processor coupled to a processor bus;
    a secondary PCI bus port connecting said bus bridge to a secondary PCI bus and adapted for bi-directional exchange of data elements with said primary PCI bus port; and
    a shared memory bus port connecting said bus bridge to a shared memory bus adapted for bi-directional exchange of data elements with said secondary PCI bus port regardless of the state of said primary PCI bus and regardless of control operations on said processor bus, wherein said shared memory bus port includes means for exchanging signals with a plurality of bridges for sharing access to said shared memory bus among said plurality of bridges commonly attached to said shared memory bus.

2. The bridge of claim 1 wherein said shared memory port further comprises:
    a FIFO for storing data elements exchanged between said secondary bus port and said shared memory bus port; and
    a shared memory control device for controlling the exchange of data elements between said FIFO and said shared memory bus.

3. The bridge of claim 2 wherein said shared memory port has a data path at least 64-bits wide, wherein said secondary bus port has a 32-bit wide data path, wherein data elements exchanged between said secondary bus port and said shared memory port comprise an alternating sequence of evenly numbered data elements and odd numbered data elements, and wherein said FIFO includes:
    a first FIFO element to exchange evenly numbered data elements between said secondary bus port and said shared memory port; and
    a second FIFO element to exchange odd numbered data elements between said secondary bus port and said shared memory port.

4. The bridge of claim 2 wherein said shared memory port has a data path width which is an integral multiple of a data path width of said secondary bus port and wherein said FIFO includes:
    a plurality of FIFO elements where the number of said plurality of FIFO elements is equal the ratio of the said data path width of said shared memory port over said data path width of said secondary bus port.

5. The bridge of claim 2 wherein said shared memory control device includes:
    a TIP threshold value indicative of the minimum number of data elements present in said FIFO before a request is generated for control of said shared memory bus through said shared memory port.

6. The bridge of claim 5 wherein said shared memory control device further includes:
    an SMW threshold value indicative of the maximum number of data elements to be written from said FIFO to said shared memory bus before relinquishing control of said shared memory bus through said shared memory port.

7. The bridge of claim 2 wherein said shared memory control device includes:
    an SMR threshold value indicative of the maximum number of data elements to be read from said shared memory bus into said FIFO following initial request of a read operation from said secondary bus port.

8. The bridge of claim 3 wherein said shared memory control devices includes:
    a base address parameter value indicative of the base starting address of said shared memory port; and
    a size parameter value indicative of the size of said shared memory port.

9. A PCI bus to PCI bus bridge comprising:
    primary PCI bus port means for connecting said bridge to a processor bus through a primary PCI bus;

secondary PCI bus port means for connecting said bridge to peripheral I/O devices through a secondary PCI bus;

PCI bridge flow control means for controlling the bi-directional exchange of data elements between said secondary PCI bus port and said primary PCI bus port;

shared memory port means for connecting said bridge to a shared memory device through a shared memory bus; and shared memory flow control means for controlling the bi-directional exchange of data elements between said secondary PCI bus port and said shared memory bus port independent of activity on said primary PCI bus and independent of control operations on said processor bus coupled to said primary PCI bus, wherein said shared memory flow control means includes means for exchanging signals with a plurality of bridges for sharing access to a shared memory connected to said shared memory bus port among said plurality of bridges commonly attached to said shared memory.

10. The bridge of claim 9 wherein said shared memory control means includes:

FIFO means for storing data elements exchanged between said secondary PCI bus port means and said shared memory port means.

11. The bridge of claim 10 wherein said shared memory port means has a data path at least 64-bits wide, wherein said secondary PCI bus port means has a 32-bit wide data path, wherein data elements exchanged between said secondary PCI bus port means and said shared memory port means comprise an alternating sequence of evenly numbered data elements and odd numbered data elements, and wherein said FIFO means includes:

a first FIFO element to store evenly numbered data elements exchanged between said secondary PCI bus port means and said shared memory port means; and a second FIFO element to store odd numbered data elements exchanged between said secondary PCI bus port means and said shared memory port means.

12. The bridge of claim 10 wherein said shared memory port means has a data path width which is an integral multiple of a data path width of said secondary PCI bus port means and wherein said FIFO means includes:

a plurality of FIFO elements where the number of said plurality of FIFO elements is equal the ratio of the said data path width of said shared memory port means over said data path width of said secondary PCI bus port means.

13. The bridge of claim 10 wherein said shared memory control means includes:

a TIP threshold value indicative of the minimum number of data elements present in said FIFO means before a request is generated for control of said shared memory bus through said shared memory port means.

14. The bridge of claim 13 wherein said shared memory control means further includes:

an SMW threshold value indicative of the maximum number of data elements to be written from said FIFO means to said shared memory bus before relinquishing control of said shared memory bus through said shared memory port means.

15. The bridge of claim 10 wherein said shared memory control device includes:

an SMR threshold value indicative of the maximum number of data elements to be read from said shared memory bus into said FIFO means following initial request of a read operation from said secondary bus port means.

16. The bridge of claim 10 wherein said shared memory control devices includes:

a base address parameter value indicative of the base starting address of said shared memory port; and a size parameter value indicative of the size of said shared memory port.

* * * * *